United States Patent
Wu et al.

(10) Patent No.: US 9,735,670 B2
(45) Date of Patent: Aug. 15, 2017

(54) POWER FACTOR CORRECTION CONVERSION DEVICE AND CONTROL METHOD THEREOF

(71) Applicant: NATIONAL CHUNG SHAN INSTITUTE OF SCIENCE AND TECHNOLOGY, Taoyuan (TW)

(72) Inventors: Chi-Sheng Wu, Taoyuan (TW); Gwo-Huei You, Taoyuan (TW); Hsuang-Chang Chiang, Miaoli (TW); Tsang-Li Tai, Miaoli (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 0 days.

(21) Appl. No.: 14/969,102

(22) Filed: Dec. 15, 2015

(65) Prior Publication Data
US 2017/0170745 A1 Jun. 15, 2017

(51) Int. Cl.
*H02M 1/42* (2007.01)
*H02M 1/14* (2006.01)
*H02M 7/04* (2006.01)
*H02M 1/00* (2006.01)

(52) U.S. Cl.
CPC ......... *H02M 1/4225* (2013.01); *H02M 1/143* (2013.01); *H02M 1/42* (2013.01); *H02M 7/04* (2013.01); *H02M 2001/0022* (2013.01); *H02M 2001/0025* (2013.01)

(58) Field of Classification Search
CPC . H02M 2001/0016; H02M 2001/0019; H02M 2001/0022; H02M 2001/0025; H02M 1/14; H02M 1/143; H02M 1/42; H02M 1/4208; H02M 1/4225
See application file for complete search history.

(56) References Cited

U.S. PATENT DOCUMENTS

| | | | | |
|---|---|---|---|---|
| 5,391,976 A * | 2/1995 | Farrington | .......... | H02M 1/4208 323/207 |
| 7,019,503 B1 * | 3/2006 | Ortiz | .......... | H02M 1/15 323/222 |
| 8,698,469 B1 * | 4/2014 | Latham, II | .......... | H02M 1/15 323/283 |
| 2003/0142519 A1 * | 7/2003 | Walters | .......... | H02M 3/156 363/89 |
| 2007/0165427 A1 * | 7/2007 | McDonald | .......... | H02M 3/156 363/41 |

(Continued)

*Primary Examiner* — Fred E Finch, III
(74) *Attorney, Agent, or Firm* — Schmeiser, Olsen & Watts, LLP (57) ABSTRACT

A power factor correction conversion device and control method thereof are adapted to send an AC signal to a power factor correction conversion device, convert the AC signal into a DC signal, and perform power factor correction of the DC signal, so as to change a power factor sent to a back-end load, wherein the control method includes a rectification step, a feedback step, a ripple calculating step, a ripple offsetting step, a logical computation step, a pulse width modulation step and a power factor correcting step. Hence, the second-order ripple component in a feedback signal is eliminated to thereby increase the response speed of the power factor correction conversion device and reduce the distortion rate of the current, thus increasing the power factor sent to the back-end load.

8 Claims, 7 Drawing Sheets

(56) References Cited

U.S. PATENT DOCUMENTS

| | | | |
|---|---|---|---|
| 2009/0237963 A1* | 9/2009 | Prasad | H02M 1/4208 363/40 |
| 2013/0169244 A1* | 7/2013 | Kim | H02M 1/15 323/234 |
| 2013/0301317 A1* | 11/2013 | Ishii | H02M 1/4225 363/44 |
| 2015/0180384 A1* | 6/2015 | An | F25B 1/005 62/498 |

* cited by examiner

POWER FACTOR CORRECTION CONVERSION DEVICE AND CONTROL METHOD THEREOF

FIELD OF TECHNOLOGY

The present invention relates to power conversion devices and control methods thereof and more particularly to a power factor correction conversion device and a control method thereof.

BACKGROUND

A load exhibits resistive impedance, inductive impedance, capacitive impedance or a combination thereof toward a power supply device. The power factor approaches 1, when the current input to the load is in phase with the voltage applied to the load. When the power factor is less than 1, the power transmitted may suffer a loss because of phase mismatch between the current and voltage or the introduction of noise. According to the prior art, to convert an AC power of a utility grid into a DC voltage, large-capacity capacitors are connected in parallel to reduce the second-order ripple component of a DC-link (DC bus) voltage and thus provide a stable DC-link voltage to a succeeding voltage transformer. However, the current distortion of the aforesaid circuit is large and contains plenty of harmonic components, thereby reducing the power factor. To reduce noise and enhance efficiency, the power supply device is usually equipped with an active power factor correction (PFC) circuit. The active power factor correction circuit uses the high-frequency switching of a power switch to cause the AC input current to follow the AC input voltage in order to attain an input current which approximates to a sinusoidal waveform and is in phase, so as to increase the power factor and reduce current harmonics.

A conventional boost PFC circuit is controlled with double loops, wherein a current control loop ensures that the input impedance of an inverter becomes resistive, whereas a voltage control loop regulates the output voltage. Since a power factor depends on the 120 Hz ripple of the output voltage, the compensation for a voltage loop not only takes into account the stability of the output voltage but also addresses the need to reduce the harmonic distortion which might otherwise be caused by the output voltage ripple. To prevent input current distortion, a conventional method involves setting the bandwidth of a voltage loop to 20 Hz approximately or even less than 20 Hz. However, the method has a drawback, that is, the system manifests slower transient response to a change of the load. To speed up the system's transient response to a change of the load, it is necessary to increase the bandwidth of the voltage loop at the expense of the fidelity of the waveform of the input current. As a result, persons skilled in the art are in a dilemma between a slow transient response from the system and a distorted waveform of the input current.

SUMMARY

It is an objective of the present invention to increase the response speed of a PFC voltage loop while keeping a low distortion rate of the input current, so as to increase the power factor sent to a back-end load.

Another objective of the present invention is to reduce the DC-link capacitance generated from PFC circuit output to thereby reduce costs.

In order to achieve the above and other objectives, the present invention provides a control method of a power factor correction conversion device, adapted to send an AC signal to a power factor correction conversion device, convert the AC signal into a DC signal, and perform power factor correction of the DC signal, so as to change a power factor sent to a back-end load, wherein the power factor correction conversion device comprises a rectification circuit, a power factor correction circuit, a control circuit, a ripple calculation circuit and a pulse width modulation circuit, the control method comprising: a rectification step for rectifying the AC input signal with the rectification circuit, so as to generate a DC signal; a feedback step for generating a feedback output signal with the control circuit coupled to the back-end load, wherein the feedback output signal comprises a feedback voltage signal and a feedback induction current signal, and the feedback output signal carries a second-order ripple signal; a ripple calculating step for converting the AC input signal into a DC input signal with the ripple calculation circuit to calculate a value of a second-order ripple signal carried by the DC input signal; a ripple offsetting step for deducting the second-order ripple signal in the feedback output signal with the control circuit according to the calculated value of the second-order ripple signal, and generating a feedback voltage signal free of any second-order ripple signal; a logical computation step for performing logical computation on the feedback voltage signal free of any second-order ripple signal, so as to generate a control signal; a pulse width modulation step for sending the control signal input to the pulse width modulation circuit and generating a pulse width modulation signal; and a power factor correcting step for performing power factor correction of the DC signal generated in the rectification step with the power factor correction circuit according to the pulse width modulation signal.

In an embodiment of the present invention, the ripple calculation circuit comprises a phase-locked loop module, an integrator, a multiplier and an amplifier, wherein, in the ripple calculating step, the AC input signal undergoes logical computation with the phase-locked loop module, the integrator, the multiplier and the amplifier sequentially, to calculate the value of the second-order ripple signal.

In an embodiment of the present invention, the control circuit comprises a comparator, a voltage error amplifier, a multiplier, a divider and a current error amplifier, wherein the logical computation step further includes a first logical computation step and a second logical computation step, wherein, in the first logical computation step, the feedback voltage signal free of any second-order ripple signal and a reference voltage signal undergo logical computation with the comparator, the voltage error amplifier, the multiplier and the divider sequentially, so as to generate a current command signal, in the second logical computation step, the current command signal and the feedback induction current signal undergo logical computation with the current error amplifier and the pulse width modulation circuit sequentially, so as to generate the pulse width modulation signal.

In an embodiment of the present invention, the rectification step is preceded by a filtering step adapted to suppress electromagnetic noise of the AC input signal with an electromagnetic interference filter.

In an embodiment of the present invention, the rectification circuit is a bridge rectifier, and the power factor correction circuit has a boost circuit framework.

In order to achieve the above and other objectives, the present invention further provides a power factor correction conversion device, comprising: a rectification circuit for receiving an AC input signal and rectifying the AC input signal, so as to generate a DC signal; and a power factor correction module coupled to the rectification circuit and adapted to perform power factor correction of the DC signal so as to change a power factor sent to a back-end load, wherein the power factor correction module comprises: a power factor correction circuit comprising an inductor and a switch component; a control circuit coupled to the back-end load and adapted to generate a feedback output signal, wherein the feedback output signal comprises a feedback voltage signal and a feedback induction current signal, and the feedback output signal carries a second-order ripple signal; a ripple calculation circuit coupled to the control circuit and the back-end load and adapted to convert the AC input signal into a DC input signal according to the AC input signal received to thereby calculate a value of a second-order ripple signal in the DC input signal, wherein the control circuit deducts a second-order ripple signal in the feedback output signal according to the calculated value of the second-order ripple signal, so as to generate a control signal; and a pulse width modulation circuit coupled to the control circuit and the power factor correction circuit and adapted to receive the control signal, so as to generate a pulse width modulation signal and thus control switching of the switch component in the power factor correction circuit.

In an embodiment of the present invention, the control circuit comprises a comparator, a voltage error amplifier, a multiplier, a divider and a current error amplifier.

In an embodiment of the present invention, the control circuit deducts the second-order ripple signal in the feedback output signal according to the calculated value of the second-order ripple signal and generates a feedback voltage signal free of any second-order ripple signal, wherein the feedback voltage signal free of any second-order ripple signal and a reference voltage signal undergo logical computation with the comparator, the voltage error amplifier, the multiplier and the divider sequentially, so as to generate a current command signal, wherein the current command signal and the feedback induction current signal undergo logical computation with the current error amplifier and the pulse width modulation circuit sequentially, so as to generate the pulse width modulation signal.

In an embodiment of the present invention, the ripple calculation circuit comprises a phase-locked loop module, an integrator, a multiplier and an amplifier, wherein the AC input signal undergoes logical computation with the phase-locked loop module, the integrator, the multiplier and the amplifier sequentially, so as to calculate the value of the second-order ripple signal.

In an embodiment of the present invention, the power factor correction conversion device further comprises an electromagnetic interference filter adapted to receive the AC input signal and coupled to the rectification circuit to suppress electromagnetic noise of the AC input signal.

In an embodiment of the present invention, the rectification circuit is a bridge rectifier, and the power factor correction circuit has a boost circuit framework.

Hence, the present invention is characterized in that: a second-order ripple component is eliminated from a feedback signal so as to increase the response speed of a power factor correction conversion device and reduce the distortion rate of the current, thereby increasing a power factor sent to a back-end load. Furthermore, the present invention reduces the DC-link capacitance generated from a PFC circuit to thereby reduce costs.

BRIEF DESCRIPTION

Objectives, features, and advantages of the present invention are hereunder illustrated with specific embodiments in conjunction with the accompanying drawings, in which.

DETAILED DESCRIPTION

Figure 1:
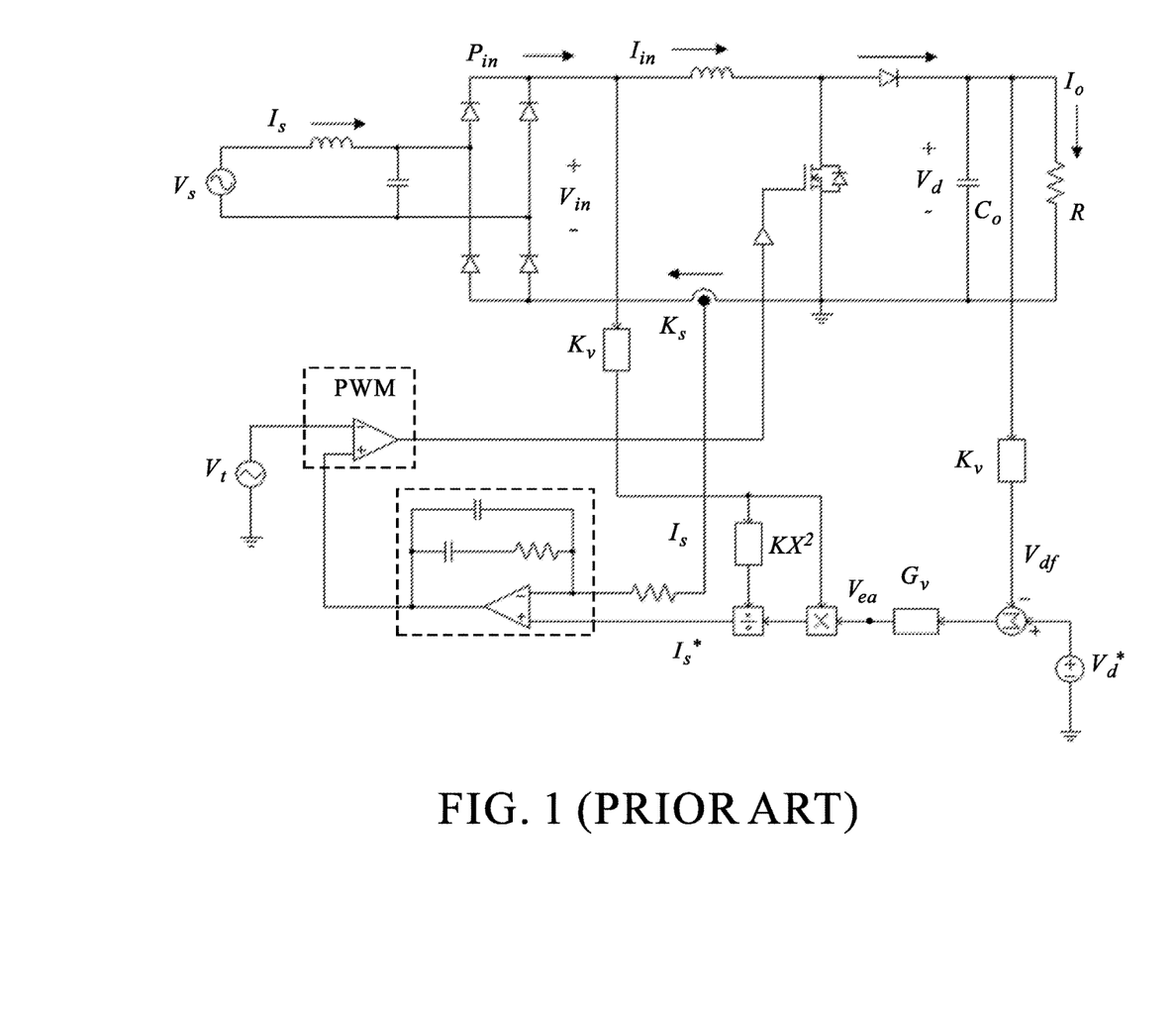
FIG. 1 (PRIOR ART) is a circuit diagram of a conventional power factor correction conversion device.
Figure 5:
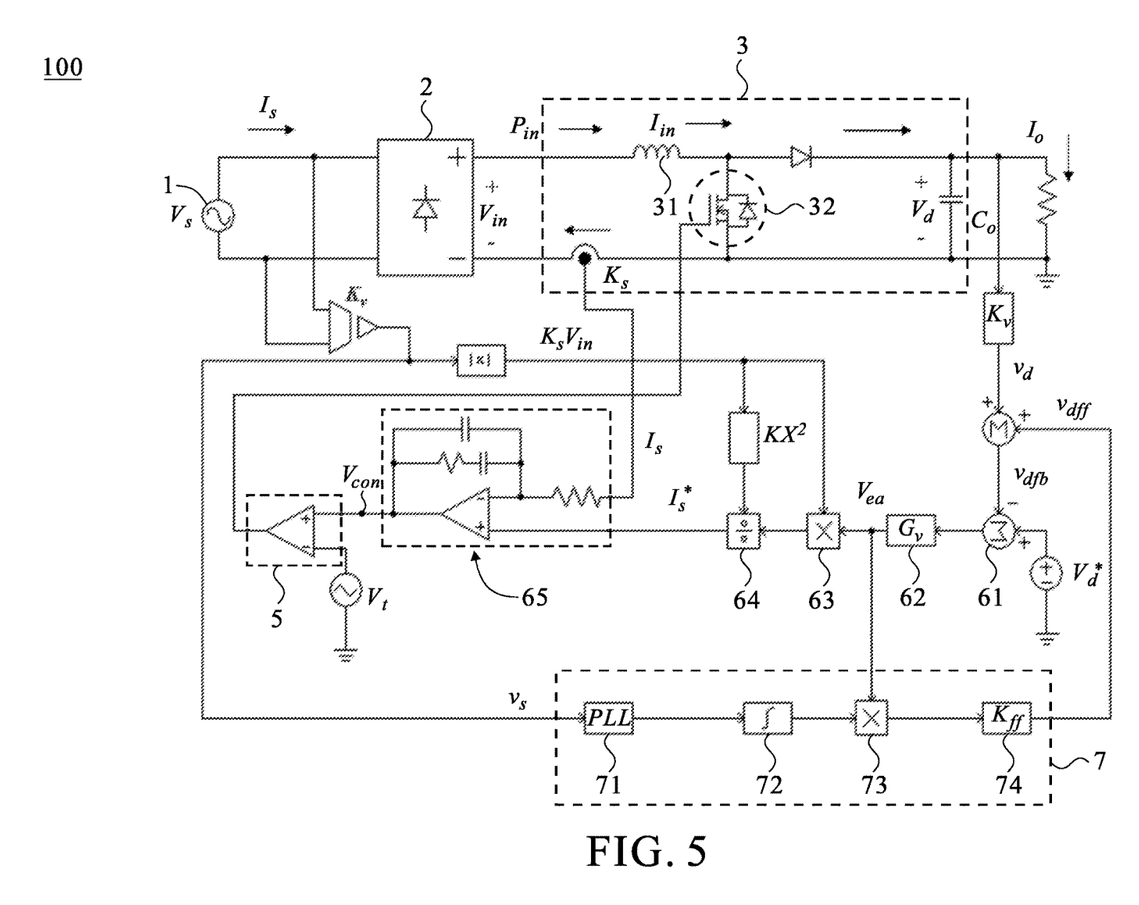
FIG. 5 is a circuit diagram of the power factor correction conversion device in an embodiment of the present invention.

FIG. 1 is a circuit diagram of a conventional power factor correction (PFC) conversion device. FIG. 5 is a circuit diagram of the power factor correction conversion device in an embodiment of the present invention. Referring to FIG. 1 and FIG. 5, in the embodiments of the present invention, a ripple calculation circuit 7 is introduced into the conventional power factor correction conversion device to provide the power factor correction conversion device of the present invention with a view to eliminating the second-order ripple component of a feedback DC-link voltage.

Figure 2:
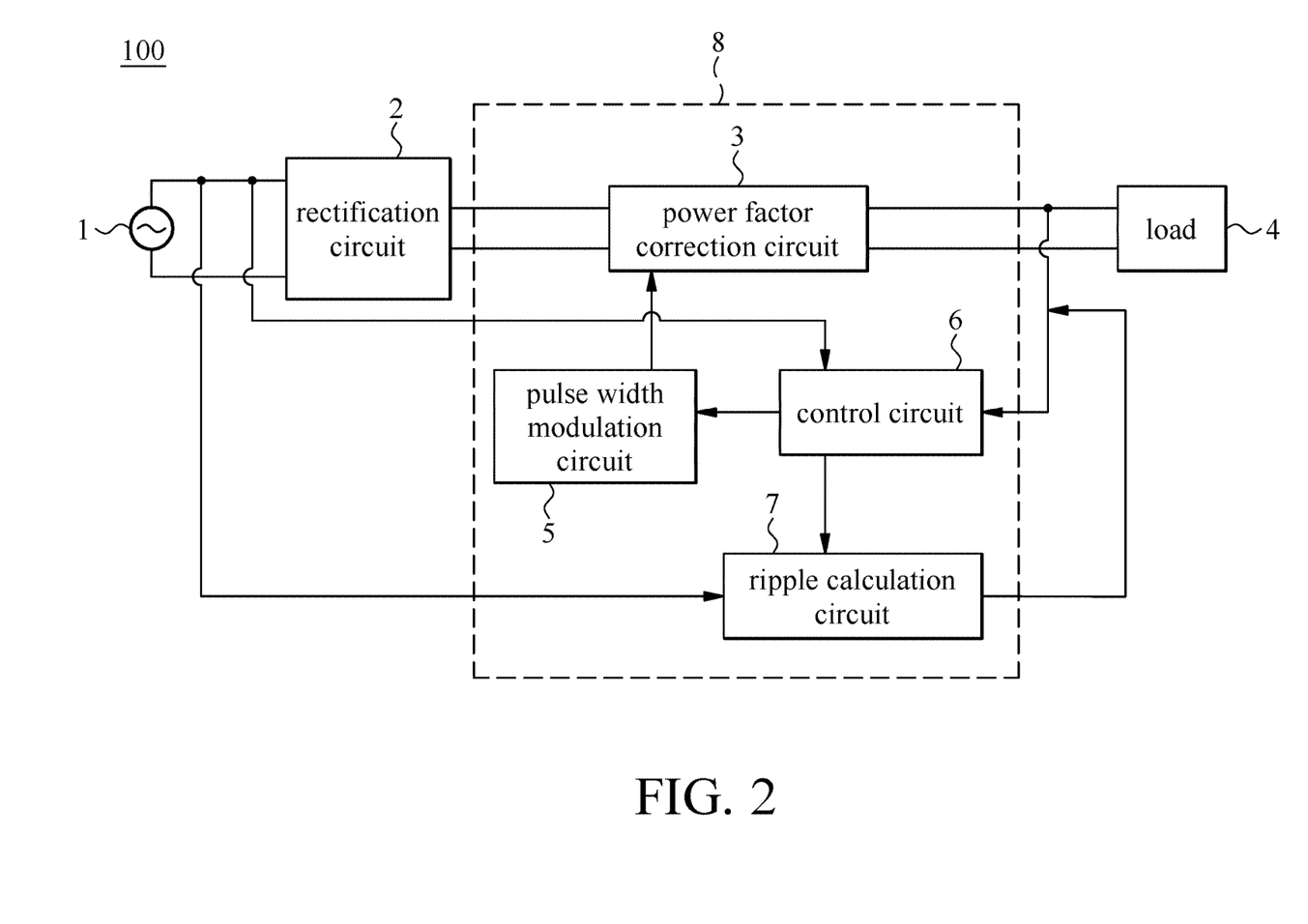
FIG. 2 is a block diagram of a power factor correction conversion device in an embodiment of the present invention.

In an embodiment, the present invention provides a power factor correction conversion device 100. Referring to FIG. 2 and FIG. 5, the power factor correction conversion device comprises a rectification circuit 2 and a power factor correction module 8. The rectification circuit 2 receives an AC input signal 1 and rectifies the AC input signal 1, so as to generate a DC signal. The power factor correction module 8 is coupled to the rectification circuit 2 and performs power factor correction of the DC signal, so as to change a power factor sent to a back-end load 4.

In the above embodiment, the power factor correction module 8 comprises a power factor correction circuit 3, a control circuit 6, a ripple calculation circuit 7 and a pulse width modulation circuit 5. The power factor correction circuit 3 comprises an inductor 31 and a switch component 32. The control circuit is coupled to the back-end load 4, so as to generate a feedback output signal. The feedback output signal comprises a feedback voltage signal $v_d$ and a feedback induction current signal $I_s$. The feedback output signal carries a second-order ripple signal. The ripple calculation circuit 7 is coupled to the control circuit 6 and the back-end load 4. The ripple calculation circuit 7 converts the AC input signal 1 into a DC input signal according to the received AC input signal 1 to thereby calculate the value of the second-order ripple signal carried by the DC input signal. The control circuit 6 deducts the second-order ripple signal in the feedback output signal according to the calculated value of the second-order ripple signal and generates a feedback voltage signal $v_{dfb}$ free of any second-order ripple signal, and then the feedback voltage signal $v_{dfb}$ free of any second-order ripple signal undergoes logical computation to generate a control signal $V_{con}$. The pulse width modulation circuit 5 is coupled to the control circuit 6 and the power factor correction circuit 3. The pulse width modulation circuit receives the control signal $V_{con}$, so as to generate a pulse width modulation signal and thus control the switching of the switch component 32 in the power factor correction circuit 3.

In an embodiment, the control circuit 6 comprises a comparator 61, a voltage error amplifier 62, a multiplier 63, a divider 64 and a current error amplifier 65. The feedback voltage signal $v_{dfb}$ free of any second-order ripple signal and a reference voltage signal $V_d^*$ undergo logical computation with the comparator 61, the voltage error amplifier 62, the multiplier 63 and the divider 64 sequentially, so as to generate a current command signal $I_s^*$. The current command signal $I_s^*$ and the feedback induction current signal $I_s$ undergo logical computation with the current error amplifier 65 and the pulse width modulation circuit 5 sequentially, so as to generate the pulse width modulation signal.

In an embodiment, the ripple calculation circuit 7 comprises a phase-locked loop module 71, an integrator 72, a multiplier 73 and an amplifier 74. The AC input signal 1 undergoes logical computation with the phase-locked loop module 71, the integrator 72, the multiplier 73 and the amplifier 74 sequentially, so as to calculate the value of the ripple signal.

In an embodiment, the power factor correction conversion device further comprises an electromagnetic interference filter (not shown) adapted to receive the AC input signal 1 and coupled to the rectification circuit 2, so as to suppress the electromagnetic noise of the AC input signal 1.

In an embodiment, the rectification circuit 2 is a bridge rectifier, and the power factor correction circuit 3 has a boost circuit framework.

Figure 3:
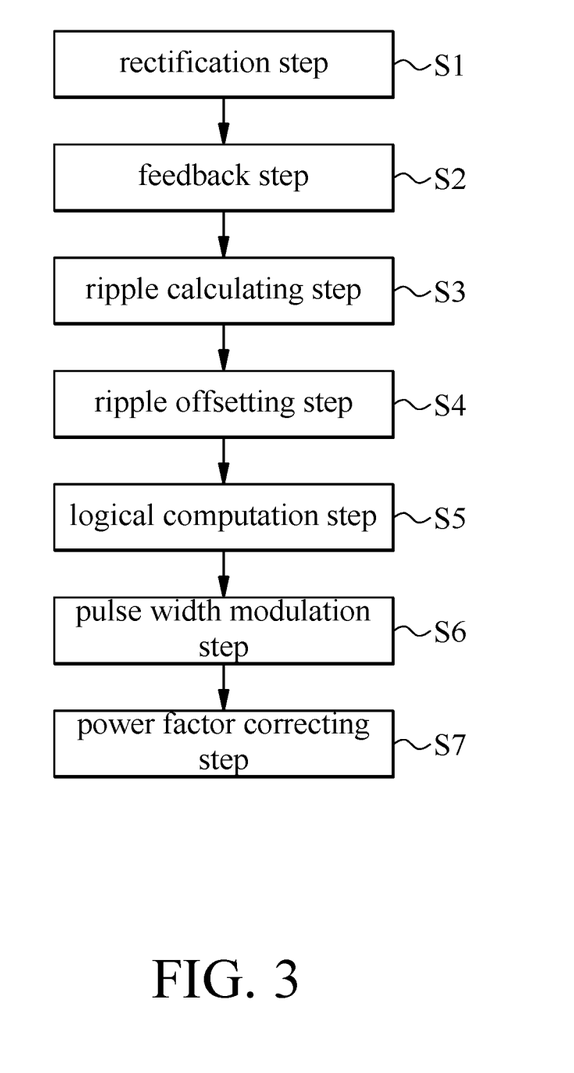
FIG. 3 is a schematic view of the process flow of a control method of the power factor correction conversion device in an embodiment of the present invention.

FIG. 2 is a block diagram of a power factor correction conversion device in an embodiment of the present invention. FIG. 3 is a schematic view of the process flow of a control method of the power factor correction conversion device in an embodiment of the present invention. Referring to FIG. 2 and FIG. 3, this embodiment provides a control method of a power factor correction conversion device. The control method involves sending an AC signal 1 to a power factor correction conversion device 100 whereby the AC signal 1 is converted into a DC signal, and then performing power factor correction of the DC signal, so as to change a power factor sent to a back-end load 4. The power factor correction conversion device 100 comprises a rectification circuit 2, a power factor correction circuit 3, a control circuit 6, a ripple calculation circuit 7 and a pulse width modulation circuit 5. The control method comprises: a rectification step S1 in which the AC input signal 1 undergoes rectification with the rectification circuit 2, so as to generate a DC signal; a feedback step S2 in which a feedback output signal is generated from the control circuit 6 coupled to the back-end load 4, wherein the feedback output signal comprises a feedback voltage signal and a feedback induction current signal and carries a second-order ripple signal; a ripple calculating step S3 in which the ripple calculation circuit 7 converts the AC input signal 1 into a DC input signal to calculate the value of the second-order ripple signal carried by the DC input signal; a ripple offsetting step S4 in which the control circuit 6 deducts the second-order ripple signal in the feedback output signal according to the calculated value of the second-order ripple signal and generates a feedback voltage signal free of any second-order ripple signal; a logical computation step S5 in which the feedback voltage signal free of any second-order ripple signal undergoes logical computation to thereby generate a control signal; a pulse width modulation step S6 in which the control signal is sent to the pulse width modulation circuit 5, so as to generate a pulse width modulation signal; and a power factor correcting step S7 in which the DC signal generated in the rectification step S1 undergoes power factor correction with the power factor correction circuit 3 according to the pulse width modulation signal.

FIG. 5 is a circuit diagram of the power factor correction conversion device in an embodiment of the present invention. In an embodiment, as illustrated with FIG. 5, the ripple calculation circuit 7 comprises a phase-locked loop module 71, an integrator 72, a multiplier 73 and an amplifier 74. In the ripple calculating step S3, the AC input signal 1 is processed with the phase-locked loop module 71 to obtain a cos 2 wt signal (assuming that the input voltage has a phase sin ωt), and then the cos 2 ωt signal is adjusted with the integrator 72 and the amplifier 74 to obtain the second-order ripple signal $v_{df}$ of the DC voltage. Afterward, the second-order ripple signal $v_{df}$ is subtracted from the DC-link voltage $v_d$ actually fed back, and thus the feedback signal $v_{dfb}$ which enters the voltage error amplifier 62 is free of any second-order ripple signal. Since a time constant of the integrator 72 can be set to be much larger than the second-order ripple frequency, the method of the present invention is not limited by the second-order ripple when designing a voltage loop.

Figure 4:
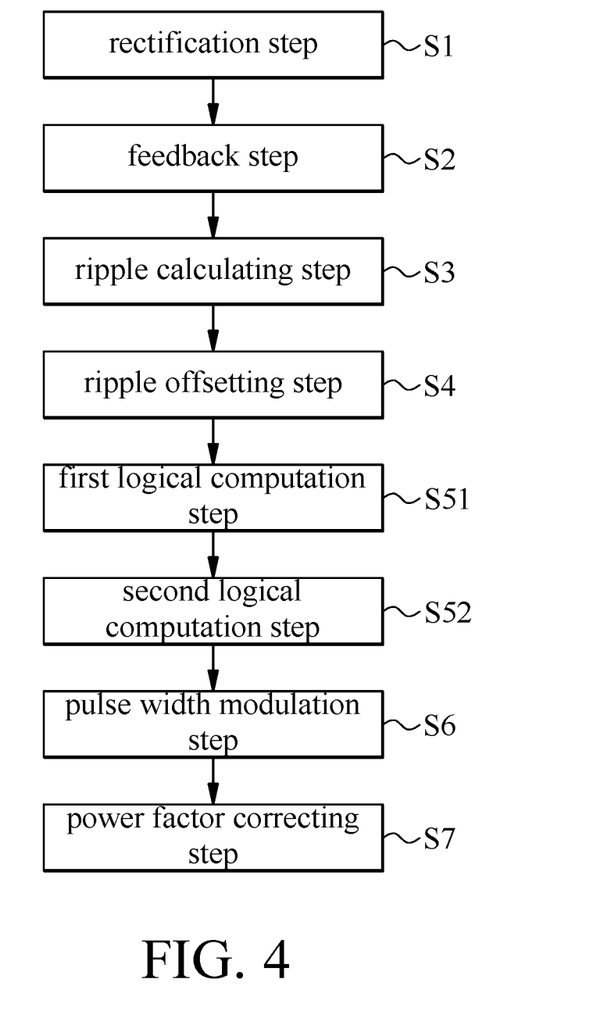
FIG. 4 is a schematic view of the process flow of the control method of the power factor correction conversion device in another embodiment of the present invention.

FIG. 4 is a schematic view of the process flow of the control method of the power factor correction conversion device in another embodiment of the present invention. Referring to FIG. 2, FIG. 4 and FIG. 5, in an embodiment, the control circuit 6 comprises a comparator 61, a voltage error amplifier 62, a multiplier 63, a divider 64 and a current error amplifier 65, wherein the logical computation step further includes a first logical computation step S51 and a second logical computation step S52. In the first logical computation step S51, the feedback voltage signal $v_{dfb}$ free of any second-order ripple signal and a reference voltage signal $V_d^*$ undergo logical computation with the comparator 61, the voltage error amplifier 62, the multiplier 63 and the divider 64 sequentially, so as to generate a current command signal $I_s^*$. In the second logical computation step S52, the current command signal $I_s^*$ and the feedback induction current signal $I_s$ undergo logical computation with the current error amplifier 65 and the pulse width modulation circuit 5 sequentially, so as to generate the pulse width modulation signal.

In an embodiment, the rectification step S1 is preceded by a filtering step (not shown). The filtering step involves sending the AC input signal to an electromagnetic interference filter for suppressing the electromagnetic noise of the AC input signal 1.

In the above embodiment, for example, the rectification circuit 2 is a bridge rectifier, and the power factor correction circuit 3 has a boost circuit framework.

Figure 6:
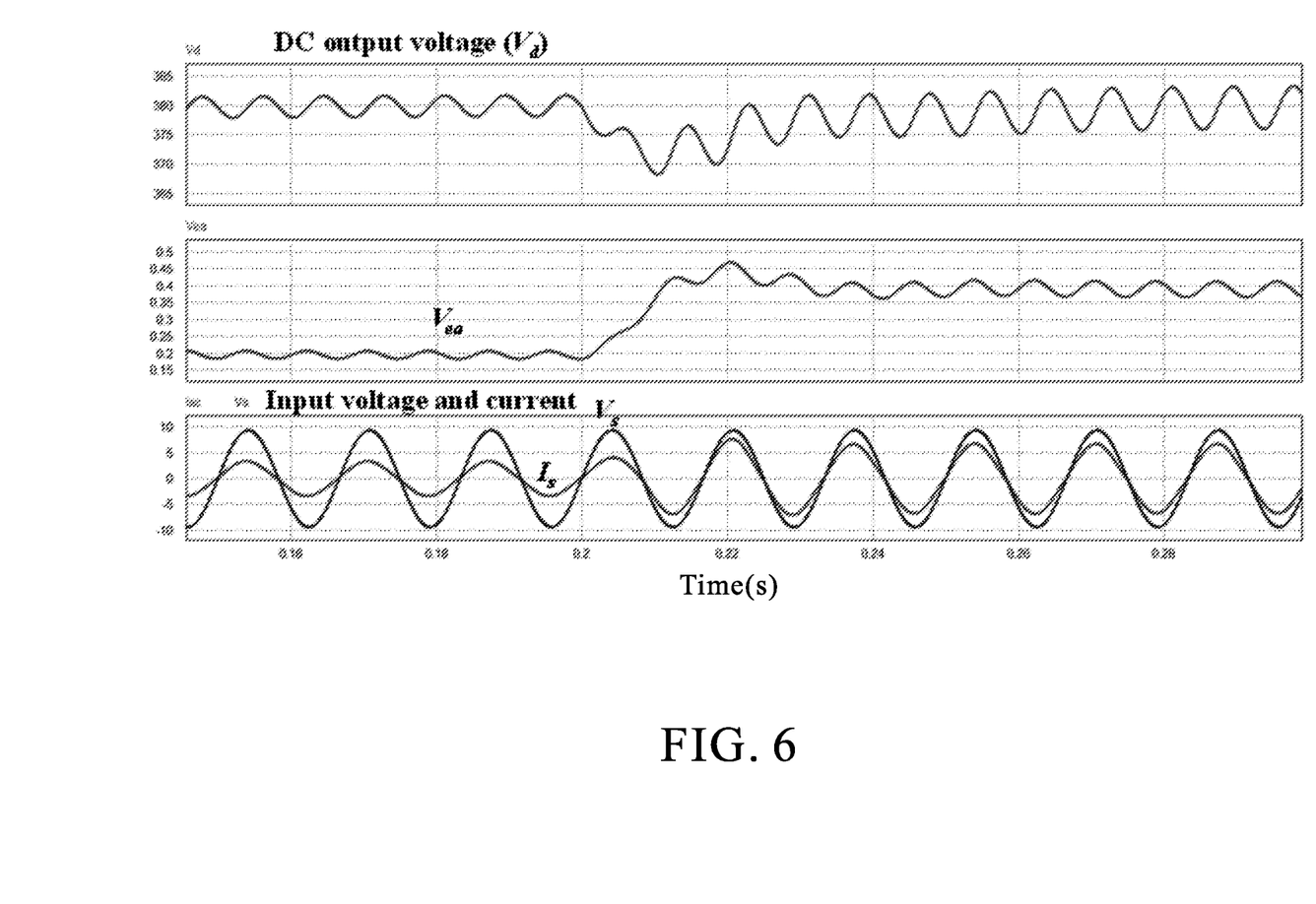
FIG. 6 shows graphs indicative of the result of simulation of input and output signals obtained according to the circuit diagram of FIG. 1.
Figure 7:
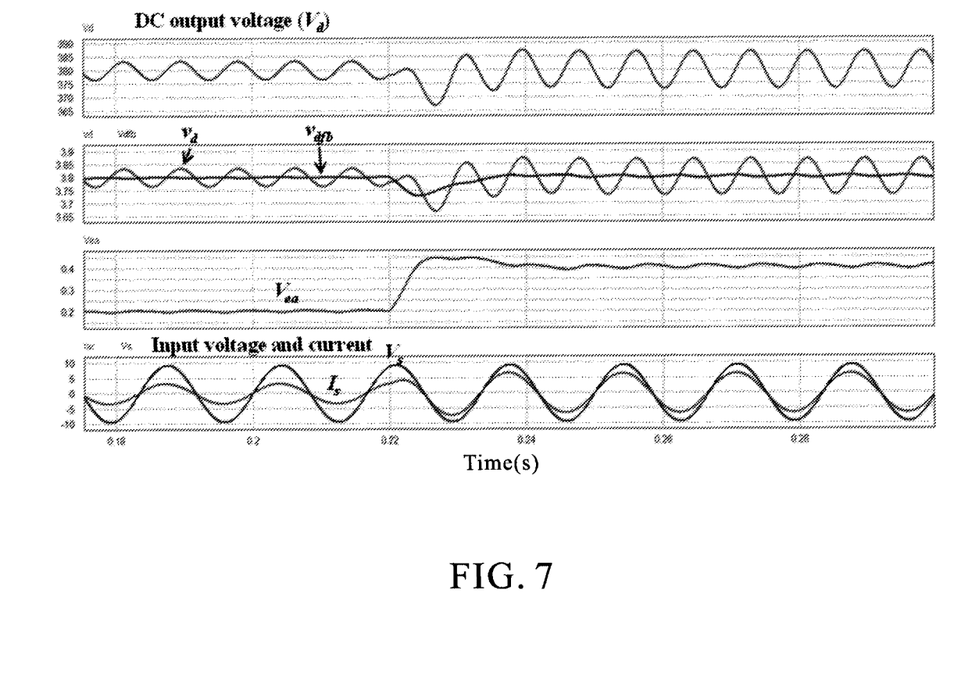
FIG. 7 shows graphs indicative of the result of simulation of input and output signals obtained according to the circuit diagram of FIG. 5.

FIG. 6 shows graphs indicative of the results of simulation of input and output signals obtained according to the circuit diagram of FIG. 1, wherein the simulation result is that the load changes from 500 W to 1 kW in the presence of an output capacitance Co of 1000 μf. FIG. 7 shows graphs indicative of the result of simulation of input and output signals obtained according to the circuit diagram of FIG. 5, wherein the simulation result is that the load changes from 500 W to 1 kW in the presence of an output capacitance Co of 500 μf.

Given the same other simulation parameters, the circuit diagram of FIG. 5 is attained by introducing a ripple calculation circuit 7 into the circuit diagram of FIG. 1, and the control method of the present invention reduces the second-order ripple component greatly. Referring to FIG. 6, given the control method of the conventional power factor correction conversion device, the response speed of the output voltage is low, and the recovery takes 40 ms or so, despite large parallel-connected output capacitance (1000 µf). Referring to FIG. 7, given the control method of the power factor correction conversion device of the present invention, even if the parallel-connected output capacitance (500 µF) is low, the second-order ripple component of the feedback voltage ($v_{dfb}$) can be greatly reduced, and the response speed of the output voltage will be high, thereby allowing the recovery to take 10 ms or so. Furthermore, as shown by the analysis performed with simulation software, the distortion rate (THD) of the current in FIG. 6 is 8.2% at 1 kW, but the distortion rate (THD) of the current in FIG. 7 is just 2.2% at 1 kW.

Compared with the prior art, the present invention provides a power factor correction (PFC) conversion device and control method, characterized in that: a ripple calculation circuit is introduced into a conventional PFC conversion device; the second-order ripple component of a feedback DC-link voltage is eliminated according to the second-order ripple value calculated with the ripple calculation circuit to overcome a drawback of the prior art, that is, limitation of bandwidth of the second-order ripple in a conventional PFC control loop, so as to increase the response speed of the PFC circuit and reduce the distortion rate of the current. Furthermore, the present invention reduces the DC-link capacitance generated from the PFC circuit to thereby reduce costs.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A control method of a power factor correction conversion device, adapted to send an AC signal to a power factor correction conversion device, convert the AC signal into a DC signal, and perform power factor correction of the DC signal, so as to change a power factor sent to a back-end load, wherein the power factor correction conversion device comprises a rectification circuit, a power factor correction circuit, a control circuit, a ripple calculation circuit and a pulse width modulation circuit, the control method comprising:
    a rectification step for rectifying the AC input signal with the rectification circuit, so as to generate a DC signal;
    a feedback step for generating a feedback output signal with the control circuit coupled to the back-end load, wherein the feedback output signal comprises a feedback voltage signal and a feedback induction current signal, and the feedback output signal carries a second-order ripple signal;
    a ripple calculating step for converting the AC input signal into a DC input signal with the ripple calculation circuit to calculate a value of a second-order ripple signal carried by the DC input signal;
    a ripple offsetting step for deducting the second-order ripple signal in the feedback output signal with the control circuit according to the calculated value of the second-order ripple signal, and generating a feedback voltage signal free of any second-order ripple signal;
    a logical computation step for performing logical computation on the feedback voltage signal free of any second-order ripple signal, so as to generate a control signal;
    a pulse width modulation step for sending the control signal input to the pulse width modulation circuit and generating a pulse width modulation signal; and
    a power factor correcting step for performing power factor correction of the DC signal generated in the rectification step with the power factor correction circuit according to the pulse width modulation signal;
    wherein the ripple calculation circuit comprises a phase-locked loop module, an integrator, a multiplier and an amplifier, wherein, in the ripple calculating step, the AC input signal undergoes logical computation with the phase-locked loop module, the integrator, the multiplier and the amplifier sequentially, to calculate the value of the second-order ripple signal.

2. The control method of claim 1, wherein the control circuit comprises a comparator, a voltage error amplifier, a multiplier, a divider and a current error amplifier, wherein the logical computation step further includes a first logical computation step and a second logical computation step, wherein,
    in the first logical computation step, the feedback voltage signal free of any second-order ripple signal and a reference voltage signal undergo logical computation with the comparator, the voltage error amplifier, the multiplier and the divider sequentially, so as to generate a current command signal,
    in the second logical computation step, the current command signal and the feedback induction current signal undergo logical computation with the current error amplifier and the pulse width modulation circuit sequentially, so as to generate the pulse width modulation signal.

3. The control method of claim 2, wherein the rectification step is preceded by a filtering step adapted to suppress electromagnetic noise of the AC input signal with an electromagnetic interference filter.

4. The control method of claim 1, wherein the rectification circuit is a bridge rectifier, and the power factor correction circuit has a boost circuit framework.

5. A power factor correction conversion device, comprising:
    a rectification circuit for receiving an AC input signal and rectifying the AC input signal, so as to generate a DC signal; and
    a power factor correction module coupled to the rectification circuit and adapted to perform power factor correction of the DC signal so as to change a power factor sent to a back-end load, wherein the power factor correction module comprises:
    a power factor correction circuit comprising an inductor and a switch component;
    a control circuit coupled to the back-end load and adapted to generate a feedback output signal, wherein the feedback output signal comprises a feedback voltage signal and a feedback induction current signal, and the feedback output signal carries a second-order ripple signal;
    a ripple calculation circuit coupled to the control circuit and the back-end load and adapted to convert the AC input signal into a DC input signal according to the AC input signal received to thereby calculate a value of a second-order ripple signal in the DC input signal, wherein the control circuit deducts a second-order ripple signal in the feedback output signal according to the calculated value of the second-order ripple signal, so as to generate a control signal; and a pulse width modulation circuit coupled to the control circuit and the power factor correction circuit and adapted to receive the control signal, so as to generate a pulse width modulation signal and thus control switching of the switch component in the power factor correction circuit;

wherein the control circuit comprises a comparator, a voltage error amplifier, a multiplier, a divider and a current error amplifier;

wherein the control circuit deducts the second-order ripple signal in the feedback output signal according to the calculated value of the second-order ripple signal and generates a feedback voltage signal free of any second-order ripple signal, wherein the feedback voltage signal free of any second-order ripple signal and a reference voltage signal undergo logical computation with the comparator, the voltage error amplifier, the multiplier and the divider sequentially, so as to generate a current command signal, wherein the current command signal and the feedback induction current signal undergo logical computation with the current error amplifier and the pulse width modulation circuit sequentially, so as to generate the pulse width modulation signal.

6. The power factor correction conversion device of claim 5, wherein the ripple calculation circuit comprises a phase-locked loop module, an integrator, a multiplier and an amplifier, wherein the AC input signal undergoes logical computation with the phase-locked loop module, the integrator, the multiplier and the amplifier sequentially, so as to calculate the value of the second-order ripple signal.

7. The power factor correction conversion device of claim 6, further comprising an electromagnetic interference filter adapted to receive the AC input signal and coupled to the rectification circuit to suppress electromagnetic noise of the AC input signal.

8. The power factor correction conversion device of claim 5, wherein the rectification circuit is a bridge rectifier, and the power factor correction circuit has a boost circuit framework.

* * * * *